July 31, 1956
E. T. HOWES ET AL
2,757,355
SEISMIC PROSPECTING APPARATUS
Filed July 3, 1953
2 Sheets-Sheet 1
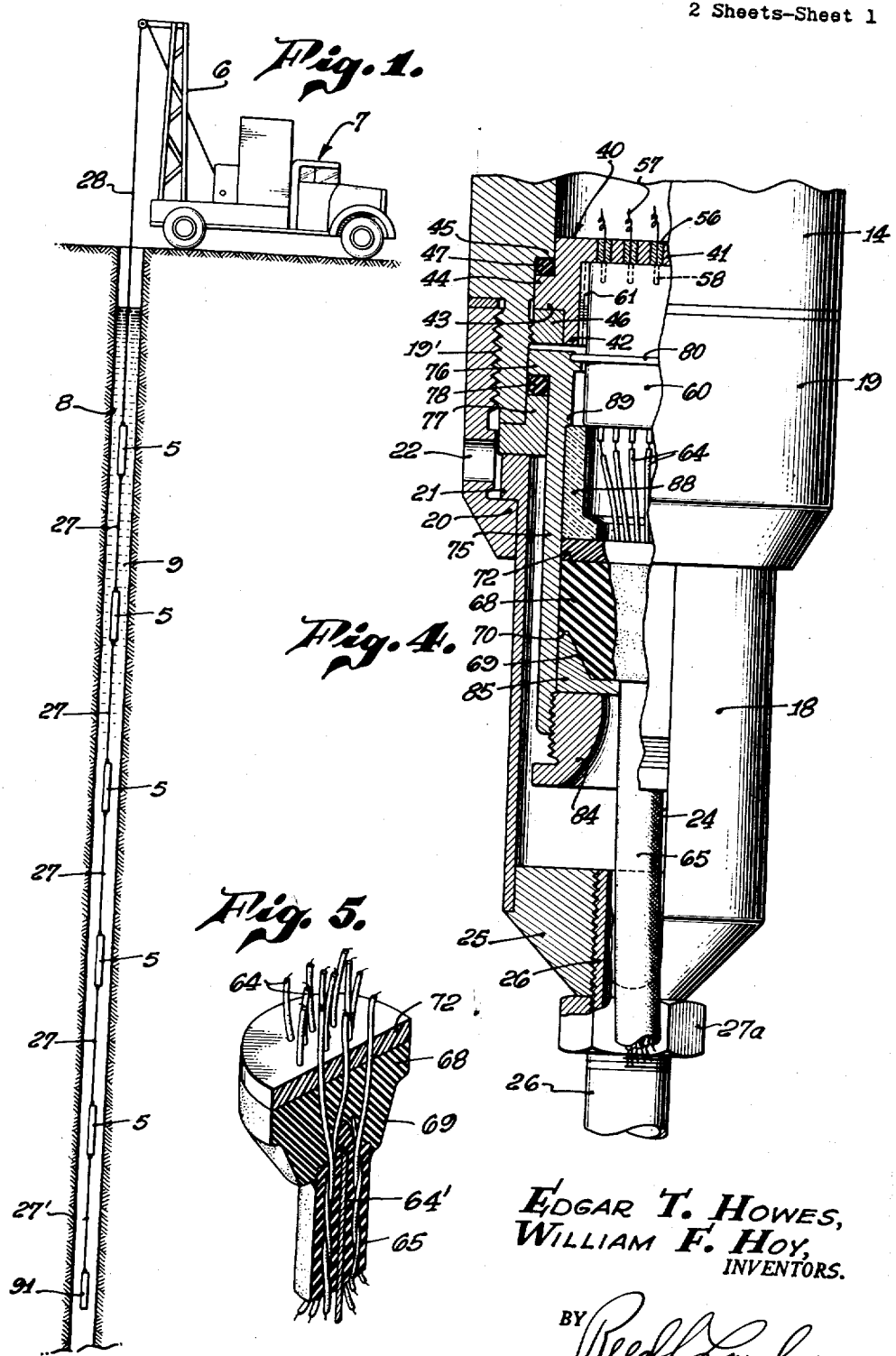
Edgar T. Howes,
William F. Hoy,
INVENTORS.
BY
Attorney.

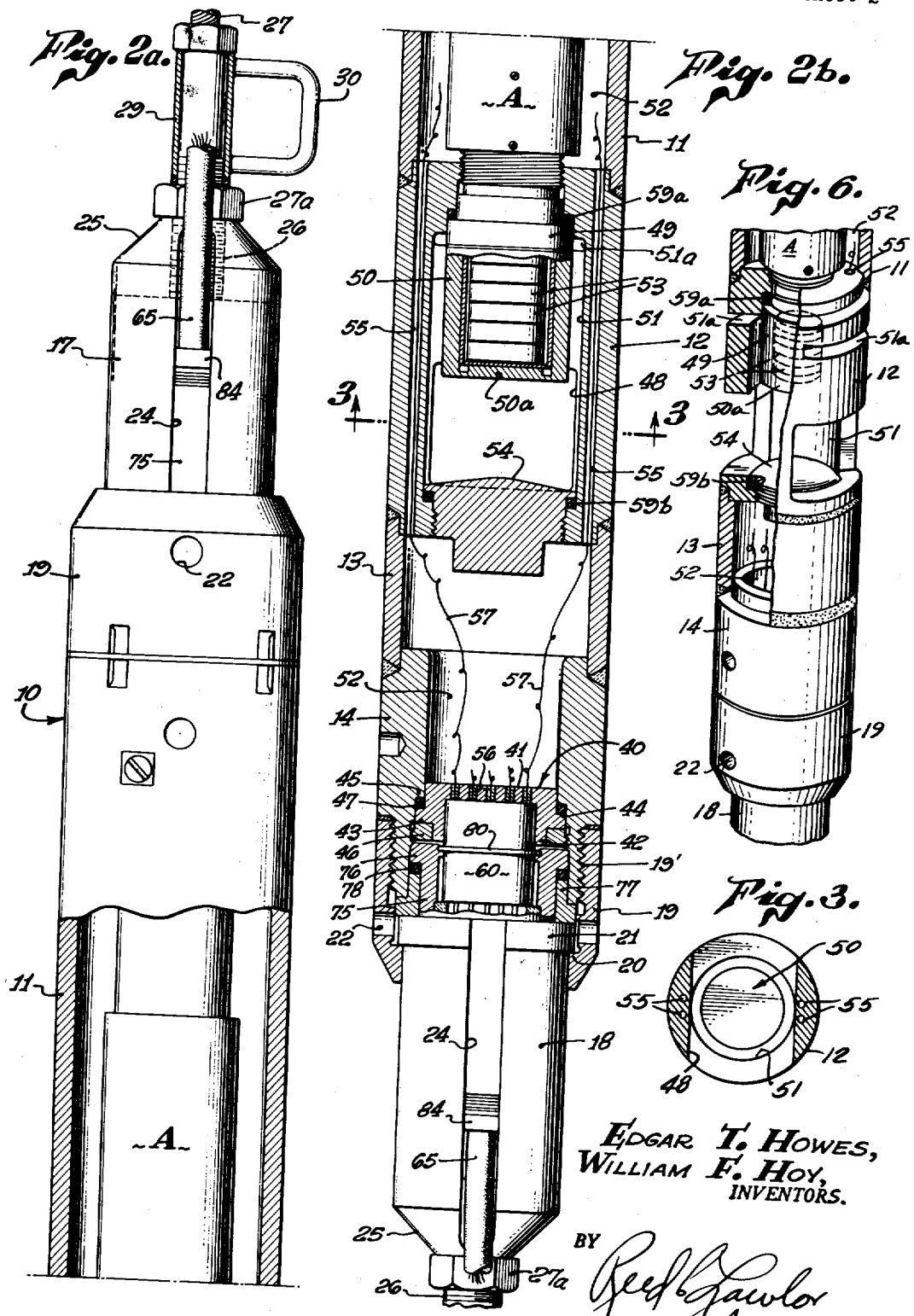

United States Patent Office 2,757,355
Patented July 31, 1956

2,757,355

SEISMIC PROSPECTING APPARATUS

Edgar T. Howes, Pasadena, and William F. Hoy, Altadena, Calif., assignors, by mesne assignments, to United Geophysical Corporation, Pasadena, Calif., a corporation of California Application July 3, 1953, Serial No. 366,030

21 Claims. (Cl. 340—7)

This invention relates to geophysical prospecting apparatus, and more particularly to improvements in apparatus for reflection seismic surveying.

Two methods of reflection seismic surveying are commonly employed, one of these methods being known as "correlation shooting" and the other being known as "continuous profiling."

In reflection seismic surveying, seismic waves are generated by detonating an explosive charge at a shotpoint adjacent the surface of the earth, usually below the weathered layer. The seismic waves so generated travel downwardly through successive subterranean strata and small amounts of the energy in the seismic waves are reflected upwardly by the successive strata. Reflected waves returning to the surface of the earth from the various strata are detected at various seismic wave receiving stations located at the surface of the earth and records are made of the returned waves. The time required for the waves to travel from the generating station to the successive strata and thence by reflection to the receiving stations is determined from the records, and these times are employed in the determination of the depth, the strike and the dip of the various reflecting strata. In correlation shooting the similarity of waves in different records is employed to recognize reflections from different widely spaced-apart portions of various strata.

In continuous profiling, a large number of receiving stations are employed and they are so arranged relative to the generating stations that waves are reflected from sub-surface strata from a series of relatively closely spaced points, and the time of travel of waves from closely spaced points that are recorded on different records is very nearly the same. Continuous profiling methods are described and claimed in Patent No. 2,329,721 issued to Herbert Hoover, Jr., et al., and Patent No. 2,259,478 issued to Charles Gill Morgan. As explained in those patents, continuous profiling is conducted by generating seismic waves at one or more generating stations and receiving the seismic waves at a number of spreads of receiving stations, but changing either the generating station or the spread of receiving stations or both between successive records. In any event, in continuous profiling, seismic waves are reflected from successive contiguous portions of the sub-surface strata while the time relationship mentioned above is maintained. In continuous profiling, similarity of waves reflected from closely spaced points is employed to recognize reflections from adjacent parts of various strata.

In correlation shooting, a small number of reception points are employed in the neighborhood of each of the generating points and the portions of the subterranean strata from which the reflected waves are received are generally more or less isolated from each other, being spaced apart by gaps that are large compared to the lengths of the portions of the subterranean strata from which waves are reflected from a particular generating point and received simultaneously at a particular spread of reception points. But in continuous profiling, such gaps are either absent or are small compared with the lengths of the portions of the subterranean strata from which reflected waves are recorded. The resultant survey of the subterranean formations determined from the records of the waves received either in the continuous profiling method or in correlation shooting is employed to determine where petroleum is most likely to be found in the area surveyed. This information is then employed as a guide in locating wells in an area under investigation or undergoing development.

In practice, it is desirable to record high frequency components of the reflected seismic waves accurately. The recording of such components facilitates the accurate measurement of the times required for a seismic wave to travel from a generating point to various reflecting strata and thence to a reception point. Accuracy in such measurements, in turn, assists the making of accurate surveys of subterranean formations.

In both continuous profiling and in correlation shooting, the waves are received by seismometers located at reception points at or adjacent the surface of the earth. Frequently, seismometers are placed directly upon the surface of the earth. Sometimes they are buried a short distance beneath the surface. In either event, the adjacent part of the earth constitutes an elastic medium which acts as a resilient member supporting the mass of the seismometer. Such a system has a resonance characteristic dependent upon the elastic properties and the density of the earth material, and also upon the mass and other properties of the seismometer. Very frequently, the resonant frequency of the system so formed lies in the range of between about 100 and about 200 C. P. S. (cycles per second). Since reflected seismic waves frequently contain substantial energy in that frequency range, the apparent time of reception of the waves varies from one seismometer to another because of the fact that the various resonant systems formed between the various seismometers and the ground have different resonant frequencies. Errors also arise because the damping characteristics of the resonant systems vary from one receiving station to another. For this reason, seismic waves received at the various seismometers are affected in different ways or to different degrees, causing errors in the timing of the recording of the waves.

Usually, an area to be explored by the methods of reflection seismic surveying has a weathered layer overlying a series of strata. Such a weathered layer is characterized by a relatively low seismic wave velocity in the range of about 500 feet per second to about 2,000 feet per second. The weathered layer also varies in thickness from one such point to another. Furthermore, the velocity varies from point to point horizontally in the area under investigation. As is well known, account is taken of such variations by weathering correction techniques.

Generally, beneath the weathered layer, there is a series of strata that are characterized by relatively high seismic wave velocities of 5,000 feet per second and higher. This velocity generally increases with depth. The velocity at any depth or in any particular stratum is relatively uniform from point to point throughout the area, or at least if it does vary, it varies to a smaller degree and in a relatively uniform manner compared with the corresponding variations in velocity in the weathered layer.

According to the invention described and claimed in copending patent application Serial No. 319,969, filed November 12, 1952, by Raymond A. Peterson, reflected seismic waves are received at a plurality of seismic wave receiving stations that are arranged beneath the weathered layer in a substantially straight vertical line that is displaced horizontally from the generating station. In the best mode of practicing that invention now contemplated, a substantial number, if not all, of the receiving stations are located at a depth of about a wavelength or more beneath the weathered layer. Furthermore, in the best mode of practicing that invention, the receivers located at the receiving stations are in the form of hydrophones, which are immersed in liquid in a receiver hole.

The present invention is concerned particularly with the apparatus employed in the practice of the invention of said copending application, said apparatus including a plurality of hydrophones arranged at stations in predetermined spaced relation along a cable which is lowered into the receiver hole containing liquid.

One object of the present invention is to provide a hydrophone structure which is highly practical and efficient in use, and which is relatively simple in construction and fluid-tight.

Another object is to provide a hydrophone comprising a pressure responsive device that is guarded against injury by objects falling in the receiver hole or by protrusions encountered by the hydrophone when it is raised or lowered in the receiver hole.

Another object is to provide a hydrophone which includes an elongate casing having means at its ends by which it is joined to the ends of support cable sections. By this means, each hydrophone is interposed between a pair of sections of a vertical cable extending downwardly into the receiver hole so as to space the hydrophones at predetermined intervals within the hole.

Another object is to provide a hydrophone which is so constructed as to enable it to withstand high hydrostatic pressures and high temperatures. In accordance with the invention, a multiple conductor cable extends downwardly into the receiver hole with its individual conductors connected to the respective preamplifiers of the successive hydrophones of the series.

Another object of the invention is to provide a series of hydrophones in which a multiple conductor cable is composed of a number of sections, each section having its ends extending into successive casings of the series, that is, connected between adjacent hydrophones.

Another object is to provide a hydrophone in which the ends of the conductor cable sections extend into the casings through lateral openings formed therein, the cable sections being unstressed and thus free from forces which might disconnect them from the hydrophones, the latter being suspended within the receiver hole solely by the support cable sections.

Another object is to provide a multiple hydrophone system in which the several conductors of the conductor cable sections are connected to multiple terminal plugs at the ends of the sections, the plugs being fully enclosed within the ends of the hydrophone casings. A related object is to provide connecting means for retaining the terminal plugs within the casings, said means embodying compressible sealing elements by which the plugs are effectively sealed from the exterior of the casings to withstand the high hydrostatic pressure existing within the receiver hole. According to the invention, one of the sealing elements is vulcanized to and around the sheath of each conductor cable section so as to prevent leakage along said sheath, the vulcanized element thus being in the nature of a cylindrical enlargement of the cable section, the element having a frusto-conical end providing a tapered inner surface of a collar which is forced thereagainst by means of a nut-like element screwed into the outer end of a sleeve or tube forming one of the parts of a holder or receiver for the multiple terminal plug. With this structure, the interior of the casing is positively sealed against the ingress of fluid under pressure, through the lateral openings thereof.

Another object is to provide in a hydrophone structure, means for retaining each terminal plug axially in place in the casing, said means including a peripheral flange on the plug which is clamped between a contact holder member and the sleeve referred to above.

A further object is to provide a hydrophone structure in which the several parts of the plug retaining means are connected to and disconnected from an end of the main casing by means of a single nut-like element or ferrule screwed onto the threaded end of the casing, thus greatly facilitating assembly and disassembly of the parts.

Further objects of the invention will appear from the following description and from the drawings, which are for the purpose of illustration only, and in which:

Fig. 1 is a vertical cross-sectional view of the earth along a line of exploration, illustrating the use of the hydrophones forming the subject matter of this invention;

Figs 2a and 2b respectively are longitudinal, part sectional views of the upper and lower portions of the improved hydrophone;

Fig. 3 is a cross-sectional view, taken on line 3—3 of Fig. 2b;

Fig. 4 is an enlarged longitudinal cross-sectional detail of the lower portion of the hydrophone;

Fig. 5 is a sectional view of one end of a cable section; and

Fig. 6 is an isometric view of the cable.

Referring to the drawings in detail, the present improved hydrophones 5 are used as indicated in Fig. 1, that is, in a vertical series or string which is suspended from above the surface of the ground by any suitable means, such as the hoist 6 of a motor truck 7. The string of hydrophones is suspended within an uncased receiver hole 8 which is drilled into the earth to a predetermined depth. The number of hydrophones may vary in accordance with the number of vertically spaced stations at which seismic waves are to be received, the vertical spacing of the hydrophones also being dependent upon the various conditions and the recording equipment employed, but usually being about ten feet apart. Since the hydrophones are identical in construction, only one will be described in detail.

Referring to Figs. 2a and 2b, each hydrophone 5 includes a main elongate tubular casing 10 which, as shown, consists of several parts 11, 12, 13 and 14, suitably joined in axial alignment, for example by welding. Secured in place at the upper end of the casing section 11 and at the lower end of the casing section 14 are upper and lower end members 17 and 18. These members 17 and 18 are held in position by means of annular clamping nuts 19 screwed onto the externally threaded ends 19' of the sections. Each of the clamping nuts is provided with an inwardly directed flange 20 that engages an external flange 21 at the inner end of the member 17 or 18 (see Figs. 2a, 2b and 4), the nuts 19 having spanner wrench holes 22. Each end member 17 and 18 has an elongate opening 24 in its side, for the purpose to be explained hereinafter.

The outer ends of the members 17 and 18 are closed by internally threaded plugs 25 into which are screwed the ends 26 of lengths or sections 27 of a rope-type multiple-strand steel supporting cable, the ends 26 being swaged or otherwise secured to the ends of the cable sections 27. Lock nuts 27a lock the ends 26 of the cable sections 27 firmly in place. As shown in Fig. 2a, the lower coupling end 26 of each cable section receives a sleeve 29 having an integral handle or bail 30 by which handling of the hydrophone is facilitated. It is to be noted at this point that, except for the sleeve 29, the construction at the upper and lower ends of the hydrophone is identical, except that opposite threads are employed at opposite ends to facilitate connection of cable ends 26 thereto. For this reason, a detailed description of one end, for example the lower end shown in Figs. 2b, 3 and 4, will suffice for a clear and full understanding of the end structures.

Referring to Fig. 4, each end structure includes, in addition to the parts 18, 19, 19', 25 and 26, a male contact element or holder 40 of hat shape, the holder having a disc-like upper portion 41 and a depending skirt portion 42. The lower end of the portion 42 is reduced in diameter to provide an annular shoulder 43. The skirt portion is further provided with a circumferential bead 44 which underlies an internal shoulder or seat 45 formed within the casing part 14. Screwed into the part 14 is a retainer ring 46 which engages the shoulder 43 of the holder 40 to force the latter inwardly and thus compresses an O-ring seal 47 between the bead 44 and the seat 45. Thus, the holder 40 is held in place within the casing section 14 or 11, as the case may be, and the interior of the casing located inwardly of the holder is effectively sealed.

As shown in Figs. 2b and 3, a lateral passage 48 extends through the casing section 12. A pressure-responsive device 49 comprising a holder 50 is mounted in a recess 51 in the upper side of the lateral passage 48. The lower end wall 50a of the holder constitutes a flexible pressure-responsive diaphragm that is exposed to fluid in the receiver hole. Narrow slots 51a are milled into the side wall of the casing in communication with the upper end of the recess 51. The slots act as vents to prevent air from being trapped therein. A pressure-responsive means in the form of a stack piezo-electric crystals 53 operatively engages the diaphragm so that when a seismic wave reaches the receiver hole, fluctuations in pressure of the fluid therein cause corresponding voltages to be generated by the piezo-electric crystals. These voltages are applied to the input of an amplifier unit A through suitable wires (not shown). The pressure-responsive device 49 is described in more detail and claimed in copending patent application Serial No. 366,093. A removable plug 54 in the wall of the lower side of the lateral passage 48 facilitates removal and replacement of the pressure-responsive device 49. Compressible O-rings 59a and 59b, respectively, provide seals between the case 12 and the pressure-responsive device 49 and the plug 54.

The section 12 is provided with longitudinal passages 55 extending past the sides of the lateral passage 48. Electrical conductors, to be later described, extend through the longitudinal passages. The male contact holders 40 close the ends of the casing 10 and, together with the pressure-responsive device 49 and the plug 54, define a divided chamber 52 in which the piezo-electric crystals 53 are disposed, the chamber being filled with dry nitrogen.

The transverse portion 41 of the contact holder 40 carries a plurality of glass insulators 56 into which extend conductors 57, the lower ends of which are joined to plug-type contact elements or prongs 58 which depend from the portion 41. In each hydrophone a pair of wires is connected to the output of the amplifier unit A and other wires may also terminate in the amplifier unit; but the remaining wires that connect to amplifiers in lower hydrophones are led through the longitudinal passages 55 to appropriate points in the lower holder. In practice, the connections are cycled or rotated in order that the hydrophones may be connected in any sequence without disturbing the association of recording elements at the surface with the respective hydrophone positions as explained more fully in copending patent application, Serial No. 355,507.

A female contact or terminal member 60 has its upper end seated within the holder 40 and is provided with holes receiving the prongs 58. The terminal member 60, which is of the type commonly referred to in the electrical art as a "Cannon" plug, has an inner dielectric body and conductor means extending therethrough. The Cannon plug 60 is properly located and held against rotation within the holder 40 by reason of a key 61 on the interior of the holder engaging in a longitudinal keyway in the side of the plug.

Connected to the conductor means of the Cannon plug 60 are the exposed ends of the wires of insulated conductors 64 of a multi-conductor cable section 65 which extends from the Cannon plug at the lower end of one hydrophone to the Cannon plug at the upper end of the next lower hydrophone of the series. The ends of the cable section 65 extend into the respective hydrophone casings 10 through the lateral openings 24 in their end members 17 and 18.

As shown in Fig. 5, the conductors 64 are arranged in twisted pairs that are positioned about a strength member in the form of a steel rope 64'. In practice, the pairs are wound helically about the axis of the cable section 65, the entire set of conductors and strength member being embedded in rubber insulation. The strength member 64' may be omitted, if desired. A rubber sealing element or head 68 is vulcanized in place to the adjacent end of the cable. This head has a frusto-conical end 69 facing the exterior of the hydrophone, and a small shoulder 70. The element 68 is also vulcanized to a disc 72 of insulating material, the disc having a plurality of mutually spaced holes in which fit tightly the several wires 64 of the cable section 65 that lead from the cable section to the terminal plug 60. The ends of the insulated conductors 64 fan outwardly from the end of each cable section to the holes in the disc through which they pass, thus assuring a fluid-tight seal about each insulated conductor.

A sleeve 75 has its upper end disposed in the annular space between the terminal plug 60 and the bore of the end 19' of the casing part 14, this end of the sleeve having a peripheral flange 76. A clamping ring 77 has a reduced upper end which is slidable in the annular space between the sleeve 75 and the end 19' of the part 14, the lower end of the ring being engaged by the upper end of the tubular member 18. Interposed between the clamping ring 77 and the flange 76 of the sleeve 75 is an O-ring seal 78. The terminal plug 60 is provided with a peripheral bead 80 which is secured to the flange 76, such as by means of a swaged bead, and is engaged between the end of the skirt 42 and the end 76 of the sleeve 75 to retain the plug firmly in place.

Screwed into the outer end of the sleeve 75 is a bushing 84 through which the cable section 65 extends. Interposed between the bushing 84 and the head 68 is a compressing ring 85 having a tapered concavity conforming to the contour of the frusto-conical end 69 of the head to adapt it to receive the head. It is thus seen that when the bushing 84 is screwed into the sleeve 75, the ring 85 functions to force the head 68 of the multi-conductor cable section 27 inwardly toward the Cannon plug 60.

A cylindrical steel liner element 88, which is split to facilitate assembly, is engaged by the disc 72 and forced against an annular shoulder 89 on the interior of the sleeve 75. By this arrangement of parts, the cable section 65 is retained in predetermined axial position. It is also to be noted that the ring 85 acts to compress the rubber head 68, causing lateral or radial expansion thereof into firm engagement with the interior of the sleeve 75 so as to seal the latter, and that the head 68, which is integral with the cable section 75, seals the latter. Consequently, the fluid which enters the end member 18 through the lateral opening 24 is prevented from passing into the chamber defined by the parts 72, 88, 60. In a like manner, the O-rings 78 and 47 effectively seal the structure against leakage of fluid into the space in which the terminal plug 60 is located and into the chamber 52 of the casing 10.

It is to be noted that if the outer sheath of a cable becomes fractured, leakage of fluid into a hydrophone along the exterior surfaces of the conductors is prevented by the vulcanized head 68. It is also to be noted that if a defect should occur in the vulcanization, such leakage is also prevented by the compression of the head 68 about the conductors 64 and against the disc 72.

With the end closure structures assembled at the upper and lower ends of the casings 10 of the several hydrophones, the multi-conductor cable sections 65 extend between the hydrophones, that is, from the lower end of one hydrophone to the upper end of the next lower hydrophone. By reason of the Cannon plug connectors 60 and the conductors 57, the several wires of the cable extend downwardly through the several hydrophones of the series, certain conductors of the cable being connected to the amplifying unit A therein. As will be apparent, a certain number of the cable conductors are terminated in each hydrophone so that a gradually diminishing number of the available cable conductors are employed for making connections to successively lower hydrophones.

As previously indicated, the several hydrophones are supported within the receiver hole 8 solely by the supporting cable 28, each section of the supporting cable 27 extending between a pair of the hydrophones of the series. The sections 65 of the multi-conductor cable, on the other hand, extend loosely between the hydrophones, so that they remain unstretched and unstressed. As shown in Fig. 1, a cable section 27' extends downwardly from the lowermost hydrophone of the series and carries a weighted sinker or anchor 91 at its lower end, the anchor serving as a pilot as the string of hydrophones is lowered into the receiver hole 8 where the hydrophones are immersed in well fluid 9.

The hydrophones of this invention are particularly useful where a high degree of accuracy is desired in the determination of the strike and dip of underlying formations as in the method described and claimed in the aforementioned copending patent application, Serial No. 319,969 and thus are particularly useful where the dips are small and where small differences in dips may mean the difference between the presence or absence of mineral deposit at a particular position in the area being surveyed. Various changes which will now suggest themselves to those skilled in the art may be made in the form, material, details of construction and arrangement of the various elements of the invention without departing from its main principles. It is therefore to be understood that the invention includes not only the specific form of construction illustrated in the drawings and described in detail herein, but also includes all other embodiments thereof within the scope of the appended claims.

The invention claimed is:

1. In seismic wave-detecting apparatus: a plurality of hydrophones adapted to be arranged in fluid, each having an elongated casing; a plurality of supporting cable sections each connected between the lower end of one of said casings and the upper end of the next lower casing; a pressure-responsive device arranged in each hydrophone, each pressure-responsive device having an external pressure-responsive diaphragm forming a part of the wall of the corresponding casing and being exposable to fluid in which said each hydrophone is immersed and having a pressure-sensitive means in the casing operatively associated with said diaphragm; an electrical amplifier unit within each casing connected to the pressure-responsive means therein; and a multi-conductor cable means having a part thereof coextensive with the hydrophones and extending through the casings thereof with its individual conductors electrically connected to said amplifier units.

2. In seismic wave-detecting apparatus: a plurality of hydrophones adapted to be supported in fluid, each hydrophone including an elongate casing having a transverse passage extending therethrough and communicating at either side with such fluid, and a pressure-responsive device arranged in the casing, said pressure-responsive device comprising an external pressure-responsive diaphragm forming a part of the transverse wall of said transverse passage and being exposable to fluid in said passage, said pressure-responsive device also comprising a pressure-sensitive means in the casing operatively associated with said diaphragm; a plurality of supporting cable sections each connected between the lower end of one of said casings and the upper end of the next lower casing; an electrical amplifier unit within each casing connected to the pressure-responsive means therein; and a multi-conductor cable means coextensive with the hydrophones and extending through the casings thereof with its individual conductors electrically connected to said amplifier units.

3. In seismic wave-detecting apparatus: a plurality of hydrophones adapted to be arranged in a bore hole filled with fluid, each hydrophone including an elongate casing having a transverse passage extending therethrough and communicating at either side with fluid in which said casing is immersed, and having a longitudinal passage means therein extending past said transverse passage, and a pressure-responsive device arranged in the casing, said pressure-responsive device comprising an external pressure-responsive diaphragm forming a part of the transverse wall of said transverse passage and being exposable to fluid in said passage, said pressure-responsive device also comprising a pressure-sensitive means in the casing operatively associated with said diaphragm; a plurality of supporting cable sections each connected between the lower end of one of said casings and the upper end of the next lower casing; an electrical amplifier unit within each casing connected to the pressure-responsive means therein; a multi-contact electrical connector plug within the upper and lower end of each casing; wires joined to the contacts of the upper connector plug of each hydrophone, certain of said wires being connected to the amplifier unit therein and the remaining wires extending through said longitudinal passage means and being joined to the contacts of the lower connector plug of each said hydrophone; and multi-conductor cable sections, each having an upper end extending into one of said casings and a lower end extending into the next lower casing, the individual conductors of said multi-conductor cable sections being joined to the contacts of said connector plugs.

4. In seismic wave-detecting apparatus: a plurality of hydrophones adapted to be supported in fluid and each having an elongate casing provided with lateral openings at its upper and lower ends; a plurality of supporting cable sections each connected between the lower end of one of said casings and the upper end of the next lower casing; a pressure-responsive device arranged in each hydrophone, each pressure-responsive device having an external pressure-responsive diaphragm forming a part of the wall of the corresponding casing and being exposable to fluid in which said each hydrophone is immersed and having a pressure-sensitive means in the casing operatively associated with said diaphragm; an electrical amplifier unit within each casing connected to the pressure-responsive means therein; a multi-contact electrical connector plug within the upper and lower ends of each casing; wires joined to the contacts of the upper connector plug of each hydrophone, certain of said wires being connected to the amplifier unit therein and the remaining wires being joined to the lower connector plug of said each hydrophone; and multi-conductor cable sections each having an upper end extending into one of said casings through the lower lateral opening thereof and a lower end extending into the next lower casing through the upper lateral opening thereof, the individual conductors of said multi-conductor cable sections being joined to the contacts of the connector plugs adjacent the ends thereof.

5. In seismic wave-detecting apparatus: a plurality of hydrophones adapted to be supported in fluid and each having an elongate casing provided with lateral openings at its upper and lower ends; a plurality of supporting cable sections each connected between the lower end of a said casing and the upper end of the next lower casing; a pressure-responsive device arranged in each hydrophone, each pressure-responsive device having an external pressure-responsive diaphragm forming a part of the wall of the corresponding casing and being exposable to fluid in which said each hydrophone is immersed, and having a pressure-sensitive means in the casing operatively associated with said diaphragm; an electrical amplifier unit within each casing connected to the pressure-responsive means therein; multi-contact electrical connector plugs within the upper and lower ends of each casing; wires joined to the contacts of the upper connector plug of each hydrophone, certain of said wires being connected to the amplifier unit therein and the remaining wires being joined to the lower connector plug of said each hydrophone; multi-conductor cable sections each having an upper end extending into a said casing through the lower lateral opening thereof and a lower end extending into the next lower casing through the upper lateral opening thereof, the individual conductors of said multi-conductor cable sections being joined to the contacts of said connector plugs; and sealing means at the upper and lower ends of said casings for sealing the interior of said casings inwardly of their said openings.

6. In seismic wave-detecting apparatus: a plurality of hydrophones adapted to be supported in fluid and each having an elongate casing having detachable end portions each provided with a lateral opening; a plurality of supporting cable sections each connected between the lower end portion of one said casing and the upper end portion of the next lower casing; a pressure-responsive device arranged in each hydrophone, each pressure-responsive device having an external pressure-responsive diaphragm forming a part of the wall of the corresponding casing and being exposable to fluid in which said each hydrophone is immersed and having a pressure-sensitive means in the casing operatively associated with said diaphragm; an electrical amplifier within each casing connected to the pressure-responsive means therein; a multi-contact electrical connector plug within each detachable end portion; wires joined to the contacts of the upper connector plug of each hydrophone, certain of said wires being connected to the amplifier unit therein and the remaining wires being joined to the lower connector plug of said each hydrophone; multi-conductor cable sections each having an upper end extending into one said casing through the lower lateral opening therein and a lower end extending into the next lower casing through the upper lateral opening therein, the individual conductors of said multi-conductor cable sections being joined to the contacts of said connector plugs; clamping means clamping said connector plugs within said casings; and compressible sealing means within said end portions sealing the interior of said casings.

7. In seismic wave-detecting apparatus: a plurality of hydrophones adapted to be supported in fluid and each having an elongate casing having detachable end portions each provided with a lateral opening; a plurality of supporting cable sections each connected between the lower end portion of one said casing and the upper end portion of the next lower casing; a pressure-responsive device arranged within each hydrophone, each pressure-responsive device having an external pressure-responsive diaphragm forming a part of the wall of the corresponding casing and being exposable to fluid in which said each hydrophone is immersed and having a pressure-sensitive means in the casing operatively associated with said diaphragm; an electrical amplifier within each casing connected to the pressure-responsive means therein; a hollow holder element having contact prongs within each detachable end portion; a multi-contact electrical connector plug within each detachable end portion and having contacts engaging said prongs; wires joined to the contacts of the upper connector plug of each hydrophone, certain of said wires being connected to the amplifier unit therein and the remaining wires being joined to the lower connector plug of said each hydrophone; multi-conductor cable sections each having an upper end extending into a said casing through a said lateral opening and a lower end extending into the next lower casing through a said lateral opening, the individual conductors of said multi-conductor cable sections being joined to the contacts of said connector plugs, each of said end portions comprising clamping means operative externally of the casing for clamping said plug in place in the casing and a sleeve disposed coaxially within the casing and through which said multi-conductor cable extends to said connector plug; a first resilient sealing means integral with said multi-conductor cable and disposed within said sleeve, said first sealing means engaging the interior of said sleeve to effect a fluid-tight seal between the multi-conductor cable and said sleeve; and a second sealing means engaging between said sleeve and the interior of said casing to effect a fluid-tight seal therebetween.

8. In a hydrophone: an elongate casing having a transverse passage extending therethrough and communicating at either side with fluid in which said casing is immersed and having longitudinal passage means therein extending past said transverse passage, and a pressure-responsive device arranged in the casing, said pressure-responsive device comprising an external pressure-responsive diaphragm forming a part of the transverse wall of said transverse passage and being exposable to fluid in said passage, said pressure-responsive device also comprising a pressure-sensitive means in the casing operatively associated with said diaphragm; an amplifying unit within the casing and electrically connected to the pressure-sensitive means; and a multi-conductor cable means extending through said casing, part of said multi-conductor cable passing through said longitudinal passage means, certain of the conductors of said cable terminating within said casing and being electrically connected to said amplifying unit.

9. In a hydrophone: an elongate casing having a transverse passage extending therethrough and communicating at either side with fluid in which said casing is immersed and having longitudinal passage means therein extending past said transverse passage, and a pressure-responsive device arranged in the casing, said pressure-responsive device comprising an external pressure-responsive diaphragm forming a part of the transverse wall of said transverse passage and being exposable to fluid in said passage, said pressure-responsive device also comprising a pressure-sensitive means in the casing operatively associated with said diaphragm; an amplifying unit within the casing and electrically connected to the pressure-sensitive means; a multi-contact connector plug at each end of the casing; and wires joined at the contact of the upper connector plug, certain of said wires being electrically connected to said amplifying unit, the remaining wires extending through said longitudinal passage means and being joined to the contacts of the lower connector plug.

10. In a hydrophone: an elongate casing having a transverse passage extending therethrough and communicating at either side with fluid in which said casing is immersed and having lateral openings at the ends thereof; a pressure-responsive device arranged in the casing, said pressure-responsive device comprising an external pressure-responsive diaphragm forming a part of the transverse wall of said transverse passage and being exposable to fluid in said passage, said pressure-responsive device also comprising a pressure-sensitive means in the casing operatively associated with said diaphragm; an amplifying unit within the casing and electrically connected to the pressure-sensitive means; a supporting cable connected axially to the ends of the said casing; said casing having a lateral opening adjacent the ends of said casing; a multi-contact connector plug at each end of the casing; clamping means operative externally of the casing for clamping said plug in place in the casing; a multi-conductor cable extending into said casing through each of said lateral openings with the individual conductors thereof joined to separate contacts of said connector plug; wires joined to the contact of the upper connector plug, certain of said wires being electrically connected to said amplifying unit, the remaining wires being joined to the contacts of the lower connector plug; and resilient fluid-tight sealing means compressed by said clamping means for sealing the interior of said casing against the entrance of fluid thereinto.

11. In a hydrophone: a casing having a lateral opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to the pressure-sensitive means; a supporting cable connected axially to the upper end of the casing; a multi-contact connector plug within the casing; clamping means operative externally of the casing for clamping said plug in place in the casing; a multiconductor cable extending into said casing through said lateral opening with its individual conductors joined to said connector plug, certain of said conductors being electrically connected to said amplifying unit; and resilient, fluid-tight sealing means compressed by said clamping means for sealing the interior of said casing against the entrance of fluid thereinto.

12. In a hydrophone: a casing having a lateral opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to the pressure-sensitive means; a supporting cable connected axially to the upper end of the casing; a multi-contact connector plug within the casing; clamping means operative externally of the casing for clamping said plug in place in the casing; a multi-conductor cable extending into said casing through said lateral opening with its individual conductors joined to said connector plug, certain of said conductors being electrically connected to said amplifying unit; and resilient, fluid-tight sealing means compressed by said clamping means for sealing the interior of said casing against the entrance of fluid thereinto, one of said sealing means being integral with said multi-conductor cable.

13. In a hydrophone: a casing having a lateral opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to the pressure-sensitive means; a supporting cable connected axially to the upper end of the casing; a hollow holder element having contact prongs; a connector plug disposed within said holder element and having contacts engaging said prongs; clamping means operative externally of the casing for clamping said plug in place in the casing; a multi-conductor cable extending into said casing through its said opening with its individual conductors joined to the contacts of said connector plug, certain of said conductors being electrically connected to said amplifying unit; and resilient, fluid-tight sealing means compressed by said clamping means for sealing the interior of said casing against the entrance of fluid thereinto, one of said sealing means being integral with said multi-conductor cable.

14. In a hydrophone: a casing having a lateral opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to the pressure-sensitive means; a supporting cable connected axially to the upper end of the casing; a hollow holder element having contact prongs; a connector plug disposed within said holder element and having contacts engaging said prongs; clamping means operative externally of the casing for clamping said plug in place in the casing; a multi-conductor cable extending into said casing through said lateral opening with its individual conductors joined to the contacts of said connector plug, certain of said conductors being electrically connected to said amplifying unit; a sleeve disposed coaxially within the casing and through which said multi-conductor cable extends to said connector plug; a first resilient sealing means integral with said multi-conductor cable and disposed within said sleeve, said first sealing means engaging the interior of said sleeve to effect a fluid-tight seal between the multi-conductor cable and said sleeve; and a second sealing means engaging between said sleeve and the interior of said casing to effect a fluid-tight seal therebetween.

15. In a hydrophone: a casing having a lateral opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to the pressure-sensitive means; a supporting cable connected axially to the upper end of the casing; a hollow holder element seated within the casing coaxially thereof, said element having contact prongs; a connector plug disposed within said holder element and having contacts engaging said prongs, said plug having a peripheral bead; a sleeve disposed coaxially within the casing and having an inner end engaging said bead of said plug; a multi-conductor cable extending into said casing through its said opening with its individual conductors joined to the contacts of said connector plug, certain of said conductors being electrically connected to said amplifying unit; a first resilient sealing means integral with said multi-conductor cable and disposed within the outer end of said sleeve; a second resilient sealing means disposed between said inner end of said sleeve and said casing; a first clamping means at the outer end of said sleeve for compressing said first sealing means laterally against the interior of said sleeve so as to prevent fluid leakage through the latter; and a second clamping means operative to retain said holder element seated within said casing, to cause the inner end of said sleeve to engage firmly against said bead of said plug so as to clamp the plug in place against said holder element, and to compress said second sealing means between said sleeve and said casing so as to prevent fluid leakage therebetween.

16. In a hydrophone: a casing having a lateral opening in its side; a pressure-responsive device arranged in said casing, said pressure-responsive device comprising an external pressure-responsive diaphragm forming a part of the casing wall and being exposable to fluid in which said hydrophone is immersed, said pressure-responsive device also comprising a pressure-sensitive means in the casing operatively associated with said diaphragm; an amplifying unit within the casing and electrically connected to the pressure-sensitive means; a supporting cable connected axially to the upper end of the casing; a hollow holder element seated within the casing coaxially thereof, said element having contact prongs; a connector plug disposed within said holder element and having contacts engaging said prongs, said plug having a peripheral bead; a sleeve disposed coaxially within the casing and having an inner end engaging said bead, said end having a peripheral flange; a multi-conductor cable extending into said casing through said lateral opening with its individual conductors joined to the contacts of said connector plug, certain of said conductors being electrically connected to said amplifying unit; a first resilient sealing means integral with said multi-conductor cable and disposed within the outer end of said sleeve; a second resilient sealing means disposed between said inner end of said sleeve and said casing and against said peripheral flange; a first clamping means at the outer end of said sleeve for compressing said first sealing means laterally against the interior of said sleeve so as to prevent fluid leakage through the latter; and a second clamping means operatively engageable with said peripheral flange so as to retain said holder element seated within said casing, to cause the inner end of said sleeve to engage firmly against said bead of said plug so as to clamp the plug in place against said holder element, and to compress said second sealing means between said sleeve and said casing so as to prevent fluid leakage therebetween.

17. In a hydrophone: a casing having an opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to said pressure-sensitive means; a supporting cable connected axially to the upper end of the casing; a hollow holder element seated within the casing coaxially thereof, said element having contact prongs; a connector plug disposed within said holder element and having contacts engaging said prongs, said plug having a peripheral bead; a sleeve disposed coaxially within the casing and having an inner end engaging said bead of said plug; a multi-conductor cable extending into said casing through its said opening with its individual conductors joined to the contacts of said connector plug, certain of said conductors being electrically connected to said amplifying unit; a first resilient sealing means integral with said multi-conductor cable and disposed within the outer end of said sleeve; a second resilient sealing means disposed between said inner end of said sleeve and said casing; a first clamping means at the outer end of said sleeve for compressing said first sealing means laterally against the interior of said sleeve so as to prevent fluid leakage through the latter; and a second clamping means operative to retain said holder element seated within said casing, to cause the inner end of said sleeve to engage firmly against said bead of said plug so as to clamp the plug in place against said holder element, and to compress said second sealing means between said sleeve and said casing so as to prevent fluid leakage therebetween, said first sealing means having a frusto-conical outer end, and said first clamping means including a ring surrounding said multi-conductor cable and slidable within said sleeve, said ring having a tapered interior receiving said frusto-conical end, said first clamping means also having a bushing screwed into the outer end of said sleeve and engaging said ring.

18. In a hydrophone: a casing having an opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to said pressure-sensitive means; a supporting cable connected axially to the upper end of the casing; a hollow holder element seated within the casing coaxially thereof, said element having contact prongs; a connector plug disposed within said holder element and having contacts engaging said prongs, said plug having a peripheral bead; a sleeve disposed coaxially within the casing and having an inner end engaging the bead of said plug and having an annular external flange within said casing; a multi-conductor cable extending into said casing through its said opening with its individual conductors joined to the contacts of said connector plug, certain of said conductors being electrically connected to said amplifying unit; a first resilient sealing means integral with said multi-conductor cable and disposed within the outer end of said sleeve; a second resilient sealing means disposed between said inner end of said sleeve and said casing; a first clamping means at the outer end of said sleeve for compressing said first sealing means laterally against the interior of said sleeve so as to prevent fluid leakage through the latter; and a second clamping means operative to retain said holder element seated within said casing, to cause the inner end of said sleeve to engage firmly against said bead of said plug so as to clamp the plug in place against said holder element, and to compress said second sealing means between said sleeve and said casing so as to prevent fluid leakage therebetween, said second clamping means including a tubular end member surrounding said sleeve and having an annular external flange at its inner end, a clamping nut screwed onto the end of the casing and having an internal flange at its outer end engaging said flange of said end member, and a compressing ring surrounding said sleeve between said flange of said end member and said flange of said sleeve and engaging said second sealing means.

19. In a hydrophone: a casing having an opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to said pressure-sensitive means; a supporting cable connected axially to the upper end of the casing; a hollow holder element seated within the casing coaxially thereof, said element having contact prongs; a connector plug disposed within said holder element and having contacts engaging said prongs, said plug having a peripheral bead; a sleeve disposed coaxially within the casing and having an inner end engaging said bead of said plug and having an annular external flange within said casing; a multi-conductor cable extending into said casing through its said opening with its individual conductors joined to the contacts of said connector plug, certain of said conductors being electrically connected to said amplifying unit; a first resilient sealing means integral with said multi-conductor cable and disposed within the outer end of said sleeve; a second resilient sealing means disposed between said inner end of said sleeve and said casing; a first clamping means at the outer end of said sleeve for compressing said first sealing means laterally against the interior of said sleeve so as to prevent fluid leakage through the latter; and a second clamping means operative to retain said holder element seated within said casing, to cause the inner end of said sleeve to engage firmly against said bead of said plug so as to clamp the plug in place against said holder element, and to compress said second sealing means between said sleeve and said casing so as to prevent fluid leakage therebetween, said first sealing means having a frusto-conical outer end, and said first clamping means including a ring surrounding said multi-conductor cable and slidable within said sleeve, said ring having a tapered interior receiving said frusto-conical end, and a bushng screwed into the outer end of said sleeve and engaging said ring, said second clamping means including a tubular end member surrounding said sleeve and having an annular external flange at its inner end, a clamping nut screwed onto the end of the casing and having an internal flange at its outer end engaging said flange of said end member, and a compressing ring surrounding said sleeve between said flange of said end member and said flange of said sleeve and engaging said second sealing means.

20. In a hydrophone comprising: a casing having an opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to said pressure-sensitive means; a supporting cable connected axially to the upper end of the casing; a hollow holder element seated within the casing coaxially thereof, said element having contact prongs; a connector plug disposed within said holder element and having contacts engaging said prongs, said plug having a peripheral bead; a sleeve disposed coaxially within the casing and having an inner end engaging said bead of said plug and having an annular external flange within said casing; a multi-conductor cable extending into said casing through its said opening with its individual conductors joined to the contacts of said connector plug, certain of said conductors being electrically connected to said amplifying unit; a first resilient sealing means integral with said multi-conductor cable and disposed within the outer end of said sleeve; a second resilient sealing means disposed between said inner end of said sleeve and said casing; a first clamping means at the outer end of said sleeve for compressing said first sealing means laterally against the interior of said sleeve so as to prevent fluid leakage through the latter; a second clamping means operative to retain said holder element seated within said casing, to cause the inner end of said sleeve to engage firmly against said bead of said plug so as to clamp the plug in place against said holder element, and to compress said second sealing means between said sleeve and said casing so as to prevent fluid leakage therebetween, said first sealing means having a frusto-conical outer end, and said first clamping means including a ring surrounding said multi-conductor cable and slidable within said sleeve, said ring having a tapered interior receiving said frusto-conical end, and a bushing screwed into the outer end of said sleeve and engaging said ring, said second clamping means including a tubular end member surrounding said sleeve and having an annular external flange at its inner end, a clamping nut screwed onto the end of the casing and having an internal flange at its outer end engaging said flange of said end member and a compressing ring surrounding said sleeve between said flange of said end member and said flange of said sleeve and engaging said second sealing means; and a third resilient sealing means compressed between said holder element and the interior of said casing.

21. In a hydrophone comprising: a casing having an opening in its side; a pressure-responsive device arranged in said casing, said pressure-responsive device comprising an external pressure-responsive diaphragm forming a part of the casing wall and being exposable to fluid in which the hydrophone is immersed, said pressure-responsive device also comprising a pressure-sensitive means in the casing operatively associated with said diaphragm; an amplifying unit within the casing and electrically connected to said pressure-sensitive means; a supporting cable connected axially to the upper end of the casing; a hollow holder element seated within the casing coaxially thereof, said element having contact prongs; a connector plug disposed within said holder element and having contacts engaging said prongs, said plug having a peripheral bead; a sleeve disposed coaxially within the casing and having an inner end engaging said bead of said plug and having an annular external flange within said casing; a multi-conductor cable extending into said casing through its said opening with its individual conductors joined to the contacts of said connector plug, certain of said conductors being electrically connected to said amplifying unit; a first resilient sealing means integral with said multi-conductor cable and disposed within the outer end of said sleeve; a second resilient sealing means disposed between said inner end of said sleeve and said casing; a first clamping means at the outer end of said sleeve for compressing said first sealing means laterally against the interior of said sleeve so as to prevent fluid leakage through the latter; a second clamping means operative to retain said holder element seated within said casing, to cause the inner end of said sleeve to engage firmly against said bead of said plug so as to clamp the plug in place against said holder element, and to compress said second sealing means between said sleeve and said casing so as to prevent fluid leakage therebetween, said first sealing means having a frusto-conical outer end, and said first clamping means including a ring surrounding said multi-conductor cable and slidable within said sleeve, said ring having a tapered interior receiving said frusto-conical end, and a bushing screwed into the outer end of said sleeve and engaging said ring, said second clamping means including a tubular end member surrounding said sleeve and having an annular external flange at its inner end, a clamping nut screwed onto the end of the casing and having an internal flange at its outer end engaging said flange of said end member and a compressing ring surrounding said sleeve between said flange of said end member and said flange of said sleeve and engaging said second sealing means; and a third resilient sealing means compressed between said holder element and the interior of said casing, said supporting cable having a threaded end screwed into a threaded axial hole in said end member.

References Cited in the file of this patent

UNITED STATES PATENTS

| 2,191,121 | Slichter | Feb. 20, 1940 |
| 2,408,478 | Petty | Oct. 1, 1946 |
| 2,440,903 | Massa | May 4, 1948 |
| 2,465,696 | Paslay | Mar. 29, 1949 |
| 2,590,531 | McLoad | Mar. 25, 1952 |
| 2,592,780 | Woods | Apr. 15, 1952 |
| 2,605,315 | Hargett | July 29, 1952 |
| 2,622,691 | Ording | Dec. 23, 1952 |
| 2,652,445 | Simpson | Sept. 15, 1953 |
| 2,661,389 | Presswell | Dec. 1, 1953 |
| 2,666,146 | Herzog | Jan. 12, 1954 |